United States Patent
Ament et al.

(10) Patent No.: US 6,595,567 B1
(45) Date of Patent: Jul. 22, 2003

(54) FOLDABLE SEPARATING DEVICE

(75) Inventors: Eduard Ament, Herrsching-Breitbrunn (DE); Marina Ehrenberger, Esslingen (DE); Holger Seel, Aidlingen (DE); Henning Sparrer, Notzingen (DE)

(73) Assignee: BOS GmbH & Co. KG (DE)

( * ) Notice: Subject to any disclaimer, the term of this patent is extended or adjusted under 35 U.S.C. 154(b) by 0 days.

(21) Appl. No.: 09/831,973

(22) PCT Filed: Aug. 30, 2000

(86) PCT No.: PCT/DE00/02949
§ 371 (c)(1),
(2), (4) Date: Aug. 6, 2001

(87) PCT Pub. No.: WO01/19649
PCT Pub. Date: Mar. 22, 2001

(30) Foreign Application Priority Data

Sep. 14, 1999 (DE) .......................................... 199 44 003

(51) Int. Cl.⁷ .............................................. B62D 33/04
(52) U.S. Cl. .................. 296/24.1; 296/37.8; 296/37.16; 16/324; 16/326; 16/327; 280/748; 280/749
(58) Field of Search .............................. 296/24.1, 37.8, 296/37.16; 280/748, 749; 410/118; 16/324, 326, 327

(56) References Cited

U.S. PATENT DOCUMENTS

| | | | | |
|---|---|---|---|---|
| 2,565,997 A | * | 8/1951 | Stone | 296/24.1 |
| 2,982,579 A | * | 5/1961 | Greenwald | 296/24.1 |
| 2,997,331 A | * | 8/1961 | Kudner | 296/24.1 |
| 2,998,279 A | * | 8/1961 | Mateny | 296/24.1 |
| 3,044,821 A | * | 7/1962 | Wicker | 296/24.1 |
| 3,049,373 A | * | 8/1962 | Biggers | 296/24.1 |
| 3,789,439 A | * | 2/1974 | Berg et al. | 5/93.2 |
| 4,281,487 A | * | 8/1981 | Koller | 248/351 |
| 4,819,300 A | * | 4/1989 | Jackson | 16/327 |
| 5,215,288 A | | 6/1993 | Lyon | |
| D348,421 S | * | 7/1994 | Dexter | 296/24.1 |
| 5,427,486 A | | 6/1995 | Green | |
| 5,542,151 A | * | 8/1996 | Stranski et al. | 16/326 |
| 5,730,542 A | * | 3/1998 | Cheng | 16/324 |
| 6,041,455 A | * | 3/2000 | Raffo et al. | 5/98.1 |
| 6,092,860 A | * | 7/2000 | Zankl et al. | 296/180.1 |
| 6,371,342 B2 | * | 4/2002 | Larsen | 224/311 |

FOREIGN PATENT DOCUMENTS

| | | |
|---|---|---|
| DE | 19641794 A1 | 4/1997 |
| DE | 19540934 A1 | 5/1997 |

OTHER PUBLICATIONS

International Search Report (Jan. 2001).

* cited by examiner

*Primary Examiner*—D. Glenn Dayoan
*Assistant Examiner*—Lori L Coletta
(74) *Attorney, Agent, or Firm*—Leydig, Voit & Mayer, Ltd.

(57) ABSTRACT

A separating device (13) includes a separating net or a separating grid (14) of a flexible material. On two edges (16, 17) of the separating net (14) that run parallel to one another, in each case a stiffening strut (19, 21) is provided. One of the two stiffening struts (19) serves for the anchoring of the separating device underneath the vehicle roof while the other stiffening strut (21) is anchored at a distance from the roof lining, for example on the (rear) seat back or on the floor of the load compartment. The two stiffening struts (19, 21) contain in each case a hinge (30). In this manner the separating device (13) can be folded up along its width and thereupon rolled-up. A packing device (96, 97) in the form of a pocket provided on the separating device (13) serves for securing of the folded separating device (13) in the packed position.

38 Claims, 9 Drawing Sheets

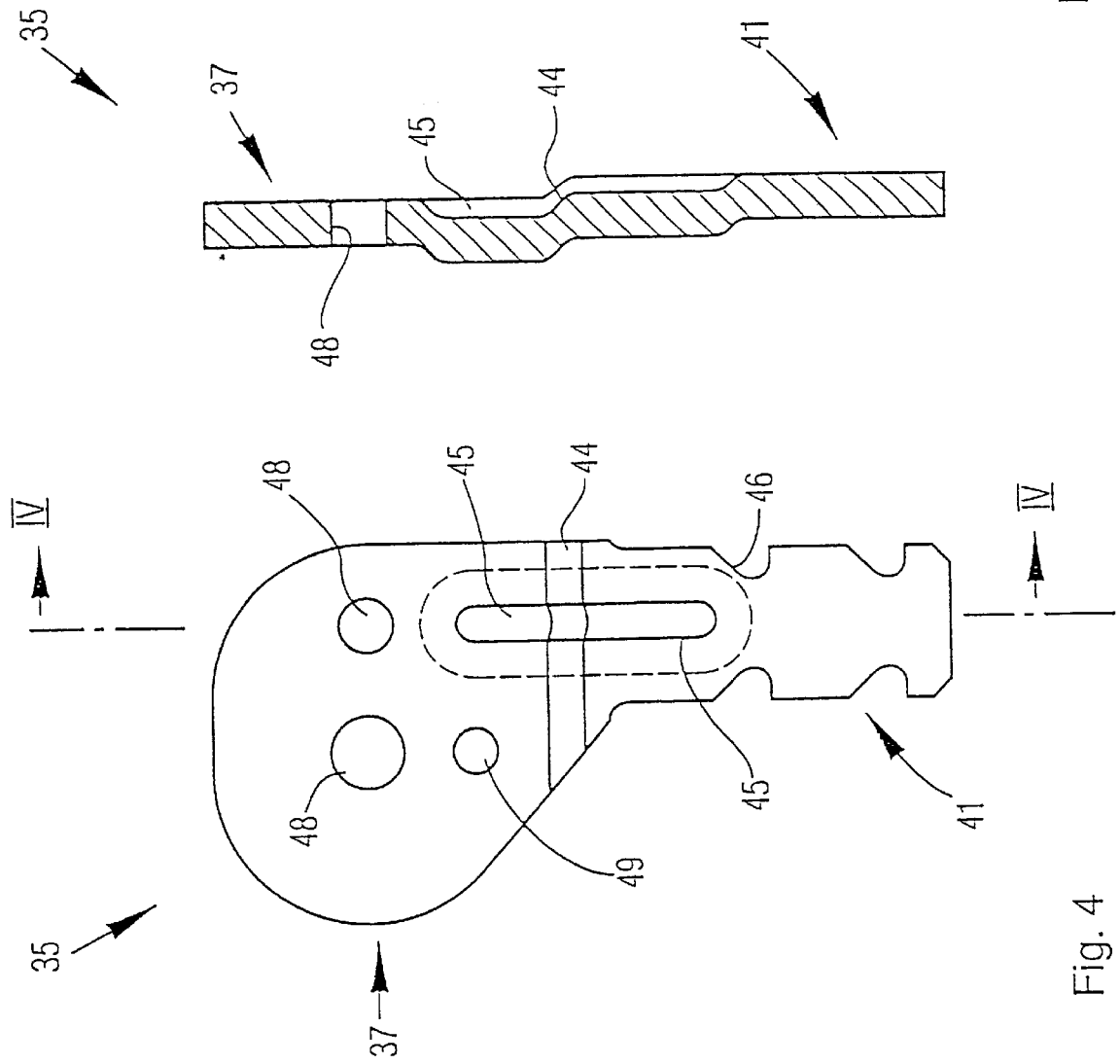

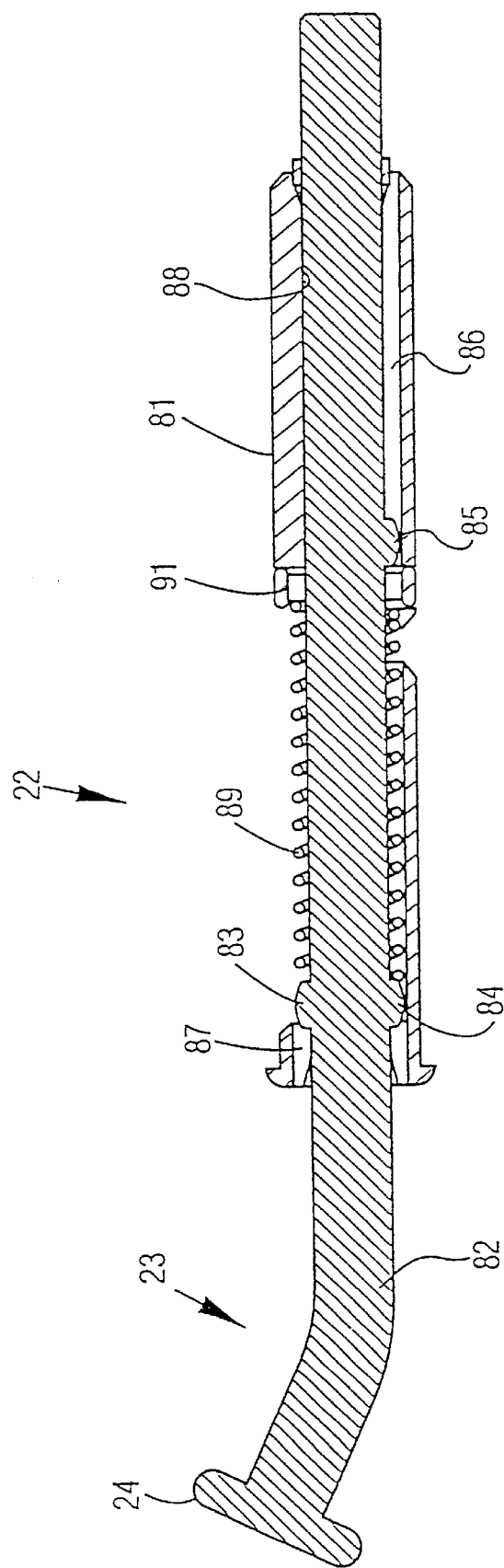

FOLDABLE SEPARATING DEVICE

FIELD OF THE INVENTION

This invention generally relates to safety nets for use in separating cargo compartments from passenger compartments in automobiles.

BACKGROUND OF THE INVENTION

From DE-A19730801 there is known a simple safety net which serves to separate the load space of a passenger car from the passenger space proper. The safety net is stretched in front of the opening that is bounded between the upper edge of the rear seat back or the front seat backs and the roof lining. Through this opening in the event of an accident, objects could be flung out of the load space into the passenger space and injure people there. The purpose of the known safety net is to prevent this.

The known safety net is provided on its upper and on its lower edges in each case with a continuous tubular strut. The upper strut is suspended with laterally shiftable anchoring members in corresponding T-groove type suspension pocket of the body work, while the lower tubular strut is fastened with simple bands to the body work base. The advantage of this known safety net lies in that, because of the absence of a housing, it is relatively light. When not in use, the safety net can be wound onto one of the two struts and it then occupies correspondingly little space. Because of the long length of the struts it is only with difficulty, that it can be located in the vehicle itself and generally, when not in use, it must be stored in the garage.

BRIEF SUMMARY OF THE INVENTION

In view of the foregoing, the object of the present invention is directed to create a safety net which, when not in use, can easily be stored in the automobile.

The novel removable separating device has an upper strut and a lower strut, between which in the state of use there extends an essentially unstretchable surface structure which is joined with the upper and lower struts. In order, when not in use, to reduce the space requirement, the upper and the lower struts are to be shortened in their effective length by at least 30% of their maximal length. Thereby the rolled-up packet of the unused separating device acquires a lesser length and can be directly accommodated in the baggage space.

An especially simple measure for achieving the shortening of the effective length lies in making the struts foldable at least once. For this the upper and the lower struts can in each case include a hinge with a hinge axis, whereby the respective strut is subdivided into two strut sections.

A maximal reduction of the effective length is achieved if the strut sections of each strut all are of equal length.

In order to not generate any tension in the surface structure during the winding of that surface structure onto the folded strut sections, the hinges are aligned on one another in such manner that with the separating device mounted the two hinges lie on a straight line which stands vertically on the two struts parallel to one another.

So that in the event of a crash, when objects are flung out of the load space against the separating device, the struts will generate as great as possible a resistance force, the hinge axes, with the separating device mounted, preferably are horizontally aligned—i.e. the hinge axes point in a direction parallel to the vehicle axis.

It is appropriate, furthermore, to arrange the hinge axis offset with respect to the strut sections adjacent to the respective hinge in such manner that the strut sections can be brought directly into a parallel position to one another when folded.

In order here to preclude a clamping or crushing hazard in the vicinity of the hinges, the shifting is advantageously large, so that beside the hinge an interspace of 1.5 to 2 cm remains when the strut sections impinge on one another at their end away from the hinge.

The device can be produced very sturdily and economically if the hinge is a single hinge with only one hinge axis.

The hinge is composed in the simplest case of two hinge lash plates which are unreleasably joined with each other by a hinging bolt. Each hinging lash plate carries a continuation over which the hinge lash plate is strongly and securely connected to the respective strut section. The continuations are aligned on the hinge lash plates so that in one position the hinge lash plates lie on a straight line that is offset laterally with respect to the hinge axis and, namely, as measured in a plane on which the hinge axis stands upright.

The handling of the separating device is substantially simplified if the hinge is lockable in at least one position. Hereby the strut, which is composed of the strut sections, can be handled like a rigid continuous strut which can easily be suspended in side receptacles in the car body. The lock mechanism can be a catch type or a lock mechanism closable in closed form. The position in which the locking occurs is appropriately the position in which the strut is fully stretched.

The hinge lash plates can have, for the purpose of locking, openings that are aligned with one another in the locking position, a bolt slidable into the openings being provided for locking. The bolt is pre-tensioned into the advanced position by means of a spring, so that the locking occurs automatically when the desired stretched position is reached.

In order to unlock the bolt, an actuating member is provided which is supported in the region of one of the two hinge lash plates, and serves the purpose of pushing the bolt rack out of at least one of the two openings.

In order to improve the resistance of the hinge lash plate to buckling at the transition point to the continuations on which the strut sections are plugged, the hinge lash plate is provided with a bead which extends into the continuation.

So that when the strut is stretched, the strut sections will extend in a straight line relative to one another, the continuation of each hinge lash plate is slightly crimped off. If the crimping-off is of an equal amount on both hinge lash plates, a single type of hinge lash plate suffices to construct the hinge. Hereby, the expenditure in manufacturing technique is simplified, because only one tool is required for the stamp-bending of the hinge lash plate.

For the purpose of an undetachably joining of the hinge lash plate with the strut sections, the hinge lash plate contains recesses or notches in its edge, which preferably are in sawtooth form.

In order to protect the hinge and the locking device against the penetration of dirt, as well as to protect the spring parts against damage, each hinge lash plate has a shell-shaped covering.

A very high resistance of the struts to bending is achieved with light weight if the strut section is tubular. In the simplest case each strut section is a cylindrical tube which is flattened in cross section in the vicinity of the hinge, the continuation being plugged into the flattened part which thereby acquires an oval cross section form.

The axial securing of the respective strut section on the continuation of the hinge lash plate occurs in that the strut section is caulked onto the continuation, in which process material of the strut section is forced into the edge-side recesses of the respective lash plate.

The straight section appropriately consists of an energy-consuming deformable material, whereby in the event of a collision the load peaks on the surface structure are reduced.

The surface structure may consist of a net or of a perforated foil.

The struts or strut sections are untwistably fastened to the surface structure, in order to simplify handling. Moreover, for simple handling, the strut sections should still be unshiftably fastened to the surface structure.

Clamping of the surface structure during folding, and a simple fabrication capability are achieved if the surface structure contains a recess in the area of the corresponding hinges.

The separating device of the invention also includes a security device which serves to secure the separating device in its packing position, so that it can be handled as a compact unit, without there being any danger that it will unwind into the separating device or unfold.

The packing device advantageously is formed by a pocket that is securely fastened to the separating device. The pocket may consist of two flexible pocket walls, each of which extends along a strut section of one of the two struts, and each of which is fastened in the region of the respective strut section. Thereby, a complete pocket is produced when the separating device, after the folding together of the two struts, is would over one of the two folded struts. By joining of the pocket walls with one another, an escape of the winding is prevented.

The two pocket walls have, suitably on their side lying away from the respective strut to which they are fastened, in each case a part of a zipper fastener. In the packing position these two edges come into an adjacent position, so as to permit the zipper fastener to be closed.

The stability of the separating device of this invention can be increased if it has, in addition to the two struts provided on the edges of the surface structure, a third strut which is constructed in the same manner as the two edge-side struts.

BRIEF DESCRIPTION OF THE DRAWINGS

Other objects and advantages of the invention will become apparent upon reading the following detailed description and upon reference to the drawings, in which:

FIG. 4 is a plan view of one of the hinge lash plates of the hinge shown in FIG. 2;

FIG. 5 is a vertical section of the hinge plane shown in FIG. 4 taken in the plane of line 4—4;

FIG. 9 is a section of one of the energy-consuming elements of the upper strut of the separating device shown in FIG. 1, and FIGS. 10 and 11 show different positions of the separating device shown in FIG. 1 during handling.

Figure 1:
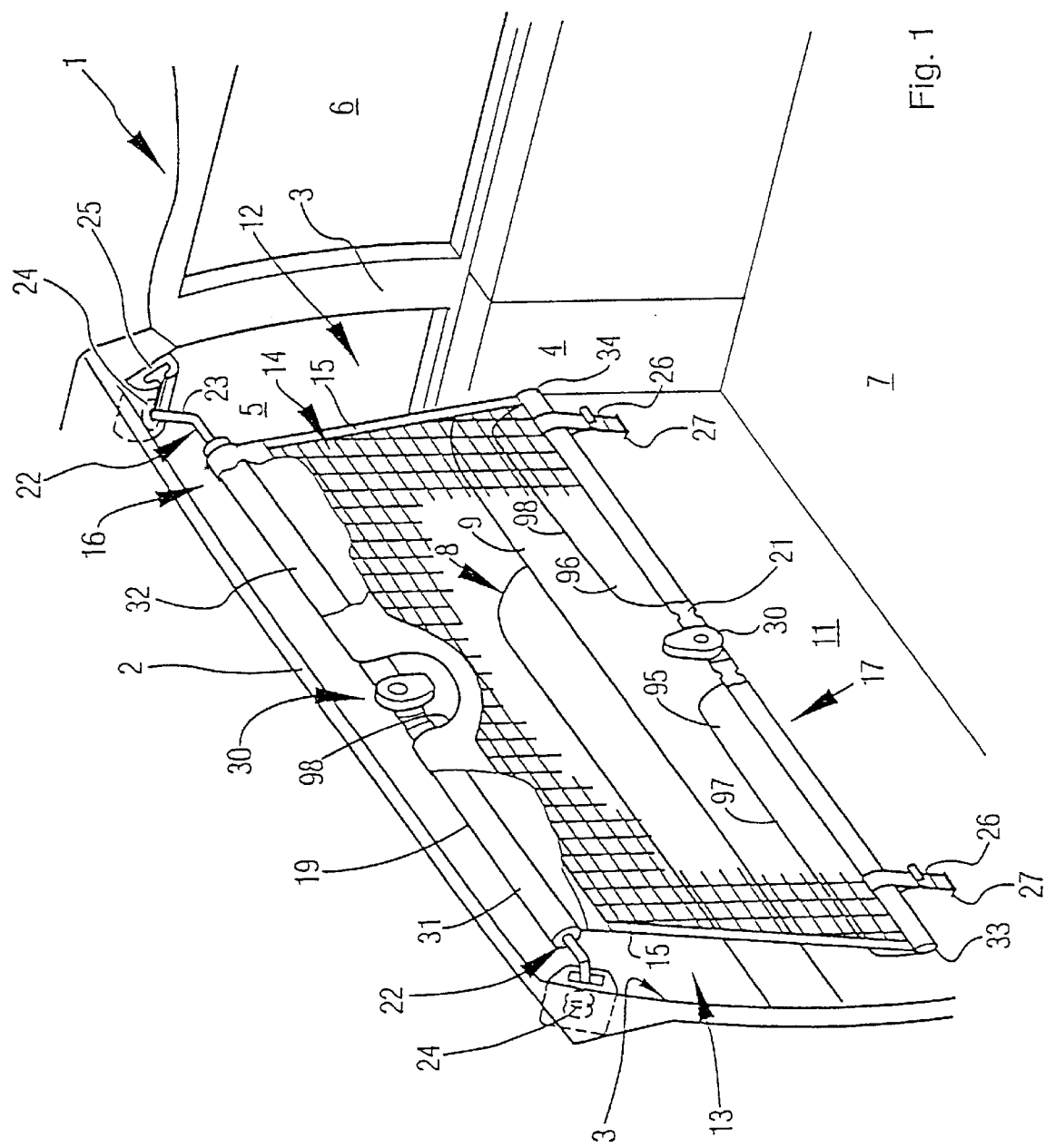
FIG. 1 is a perspective of a separating device in accordance with the invention spanned between the roof of a motor vehicle and the rear seat back.

While the invention is susceptible of various modifications and alternative constructions, a certain illustrative embodiment thereof has been in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

FIG. 1 shows in broken-open representation a rear area 1 of a station wagon. The rear area 1 is represented in perspective about from the view of the broken-away, left-side rear window. It has a roof 2, which is supportedly laterally by two C-columns 3. In front of the C-column 3 there lies, underneath the roof 2 and above a side wall 4, a rear side window 5, while behind C-column 3 a further rear side window 6 is arranged. The arrangement of the side windows 5, 6 is as in mirror image on the left side of the rear area 1.

The rear area 1 is closed off underneath by an essentially level loading surface 7.

Between the two rear side windows 5, a rear seat back 9 is located at the height of the C-columns, the rear seat back 9 stands about between the two C-columns 3.

Between the under-edge of the roof 2 and the upper-edge of the rear seat back 9 an opening 12 is provided, over which a passenger space present in front of the rear seat back 9 communicates with the load space of the rear area 1, located behind it.

In order, in the event of a crash, to prevent objects from being flung out of the rear area 1 and into the passenger space, the opening 12 is closed by a separating device.

The separating device 13 includes a surface structure in the form of a trapezoidally shaped separating net 14, which is laterally bordered by bordering bands 15, and the upper edge, and lower edge of which are formed, in each case by a sewn-on and welded-on tubular loop 16, 17. A strut 19 extends through the loop 16 which, additionally, is connected with the loop 16 by means of rivets (not shown) for example, in order to prevent the strut 19 from rotating inside the loop 16, or from shifting in the longitudinal direction of the strut 19.

The connection between the lower strut 21 and the lower loop 17 is executed in a similar manner; i.e. the strut 21 likewise can neither rotate nor shift inside the loop 17.

The strut 19 is tubular in form and it contains in its outward pointing ends energy-consuming elements 22, the construction of which is shown in detail in FIG. 9.

Anchoring elements 23 project from the energy-consuming element 22, which carry end-side mushroom-shaped heads 24. With these mushroom-shaped heads 24, the anchoring elements 23 are received inside body work T-grooves 25.

The under edge of the strut 21 is fastened with the aid of two tension bands 26, and of not further shown hooks on eyes 27 which are applied to the rear side 11 of the rear seat back 9. The tension band 26 is limitedly stretchable.

According to the invention, the two struts 19, 21 are shortenable in their effective length. For this purpose both the strut 19 and also the strut 21 contain a middle hinge 30 which, for example, divides the strut 19 into a left strut section 31 and a right strut section 32. In a similar manner, the strut 21 is subdivided by the hinge 30 into a left and a right strut section 33, 34, respectively.

The construction of the hinges 30 and their connection with the tubular strut sections 31–34 are explained in the following with the aid of FIGS. 2 to 8.

The hinge 30 includes two identical hinge lash plates 35*a* and 35*b* which are executed as plate shaped and stamped parts, as well as two shell shaped hinge covers 36*a*, 36*b*, which are nearly identical.

The hinge lash plate 35*a* is composed of a plate shaped lash section 37 with two flat sides 38, 39 parallel to one another, and a continuation 41 proceeding therefrom in one piece. The thickness of the continuation 41 is equal to the thickness of the lash plate section 37, and this, too, is bounded by an essentially level flat side 42 and a flat side 43 parallel thereto. The lash section 37, as viewed in plan, in the broadest sense has an about triangular shape with several rounded corners. At the transition point from the level lash section 37 to the continuation 41, the hinge lash plate 35*a* is provided with a crimp 44. The crimp 44 has a depth such that the middle plate between the flat sides 42 and 43 of the continuation 41 is flush with the flat side 37.

Otherwise, the continuation 41 runs parallel to a plane which is defined, for example by the flat side 37.

In order to reinforce the transition between the lash section 37 and the continuation 41, a lengthwise oval bead 45 is provided, which extends through the crimp 44 and one end of which is located in the lash section 37 and the other in the continuation 41. The bead 45 is formed in such manner that it rises from the flat sides 39 and 43, i.e., it is concave on the side on which the continuation 41 is raised with respect to the flat side 38, as a result of the crimp 44. This formation is best seen from FIG. 5.

As a result of the crimp, the two identical hinge lash plates 35*a* and 35*b* can be brought into engagement with their flat sides 38, while the associated continuations 41 are then located in a common plane; i.e. they have, with respect to the separating surface on which the two flat sides 38 lie on one another, in each case the same displacement in opposite direction.

The continuation 41 contains in oppositely located edges, altogether four notches or incisions 46 developed about in sawtooth form, which serves in a further described other manner for fastening the strut sections 31–34.

In the lash plate section 37, two cylindrical bores 47, 48, are provided as well as the threaded bore 49. The bore 47, as the figures make evident, is clearly offset with respect to the continuation 41. It forms with mounted hinge 30, as FIG. 2 shows, the hinge bore through which a hinge bolt 51 leads, which is provided on both sides with a closing head or a rivet head.

Figure 2:
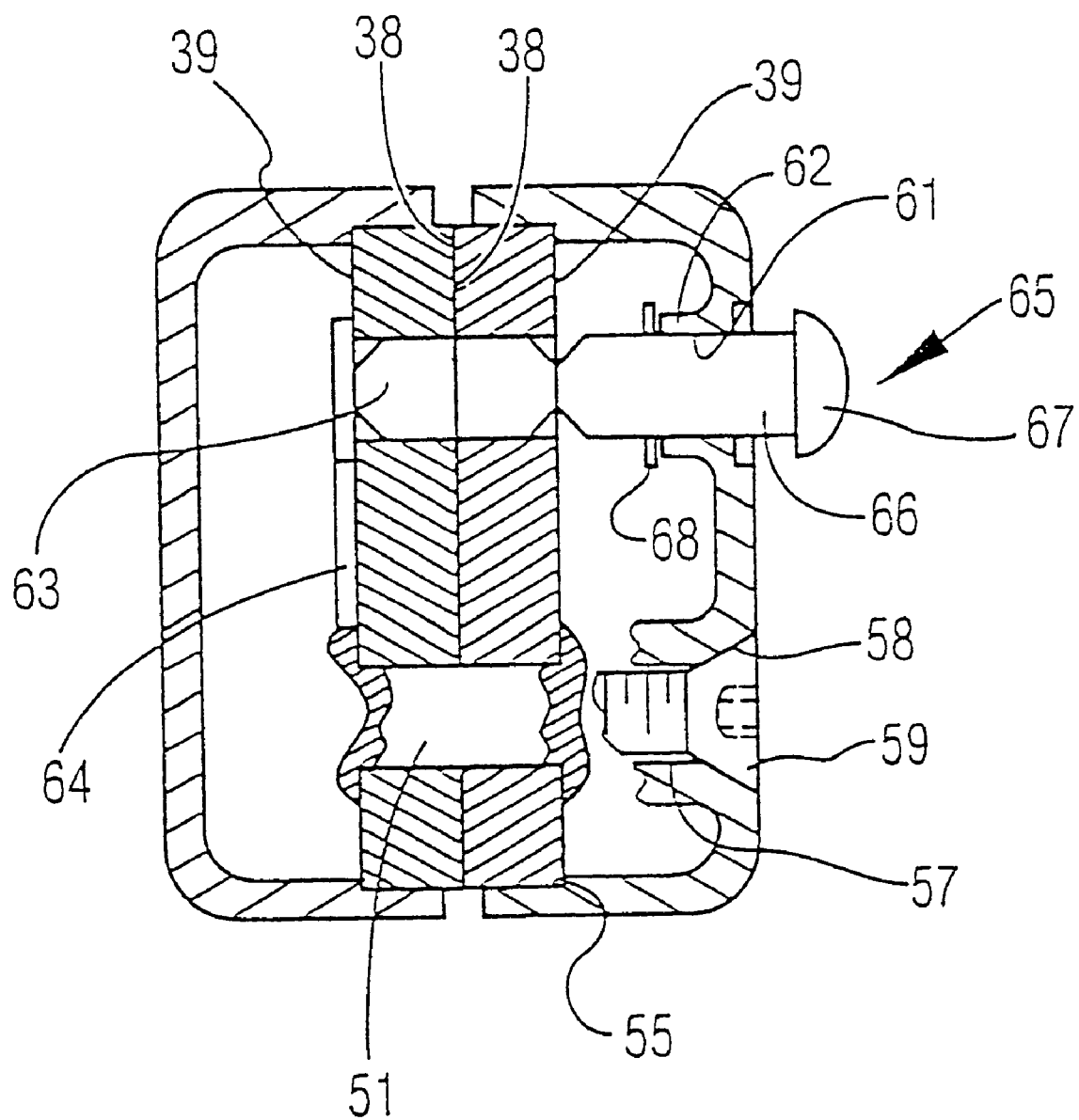
FIG. 2 is a vertical section of the middle hinge of the struts of the separating device shown in FIG. 1, taken in a plane parallel to the hinge axis.
Figure 3:
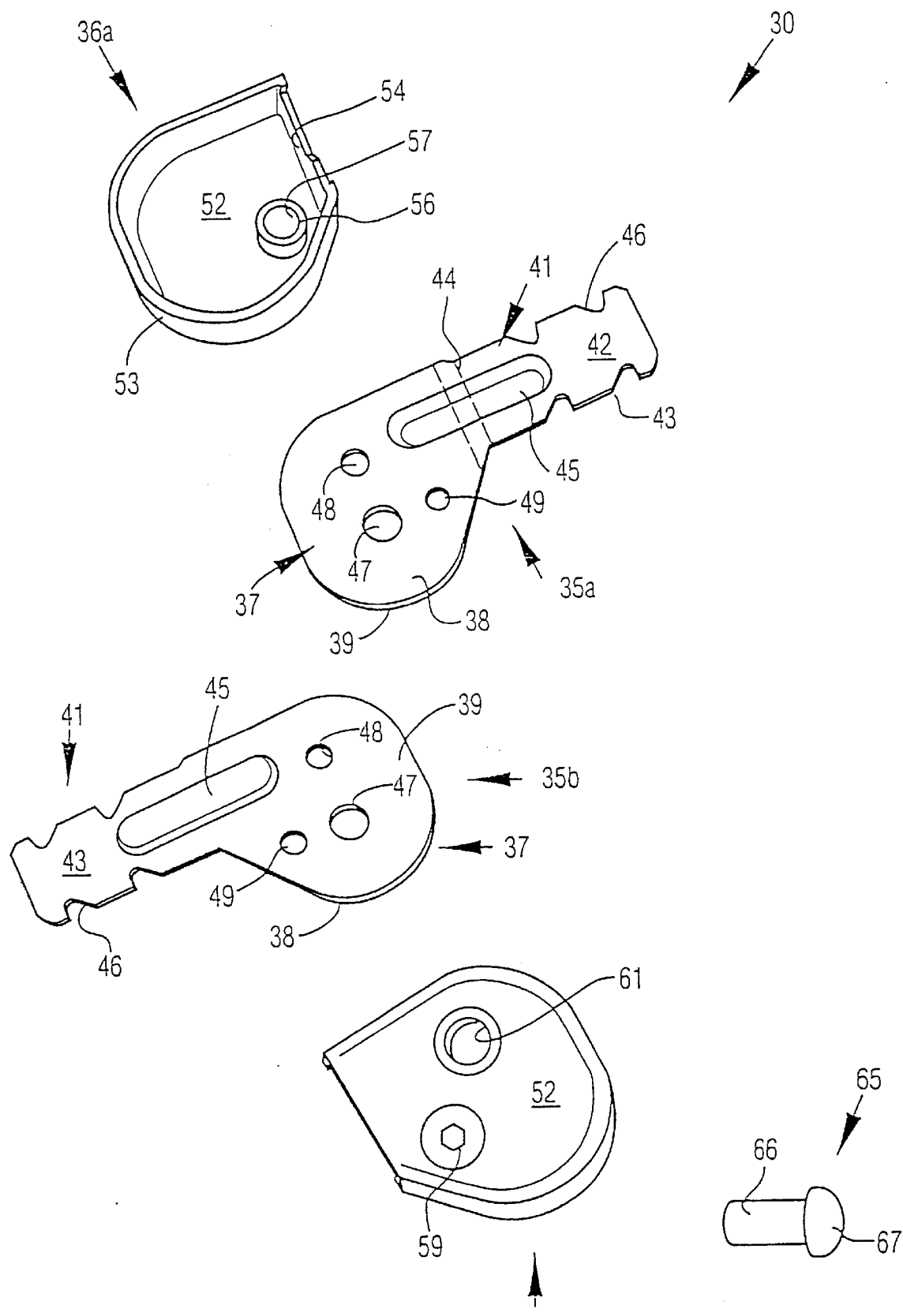
FIG. 3 is an exploded view of the middle hinge shown in FIG. 2.
Figure 6:
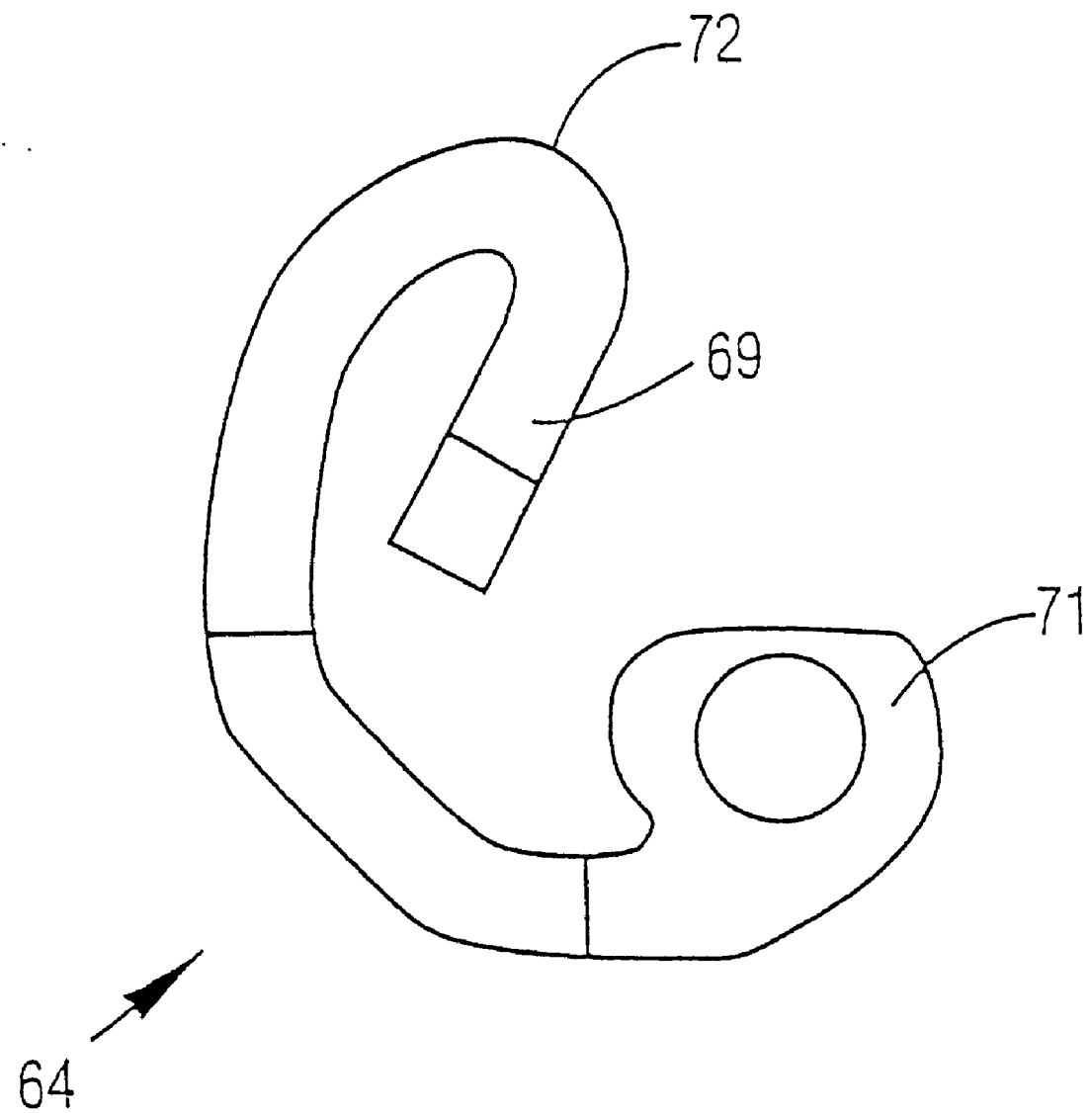
FIG. 6 is a plan view of a spring for the pre-stressing the hinge locking bolt of the hinge shown in FIG. 2.
Figure 7:
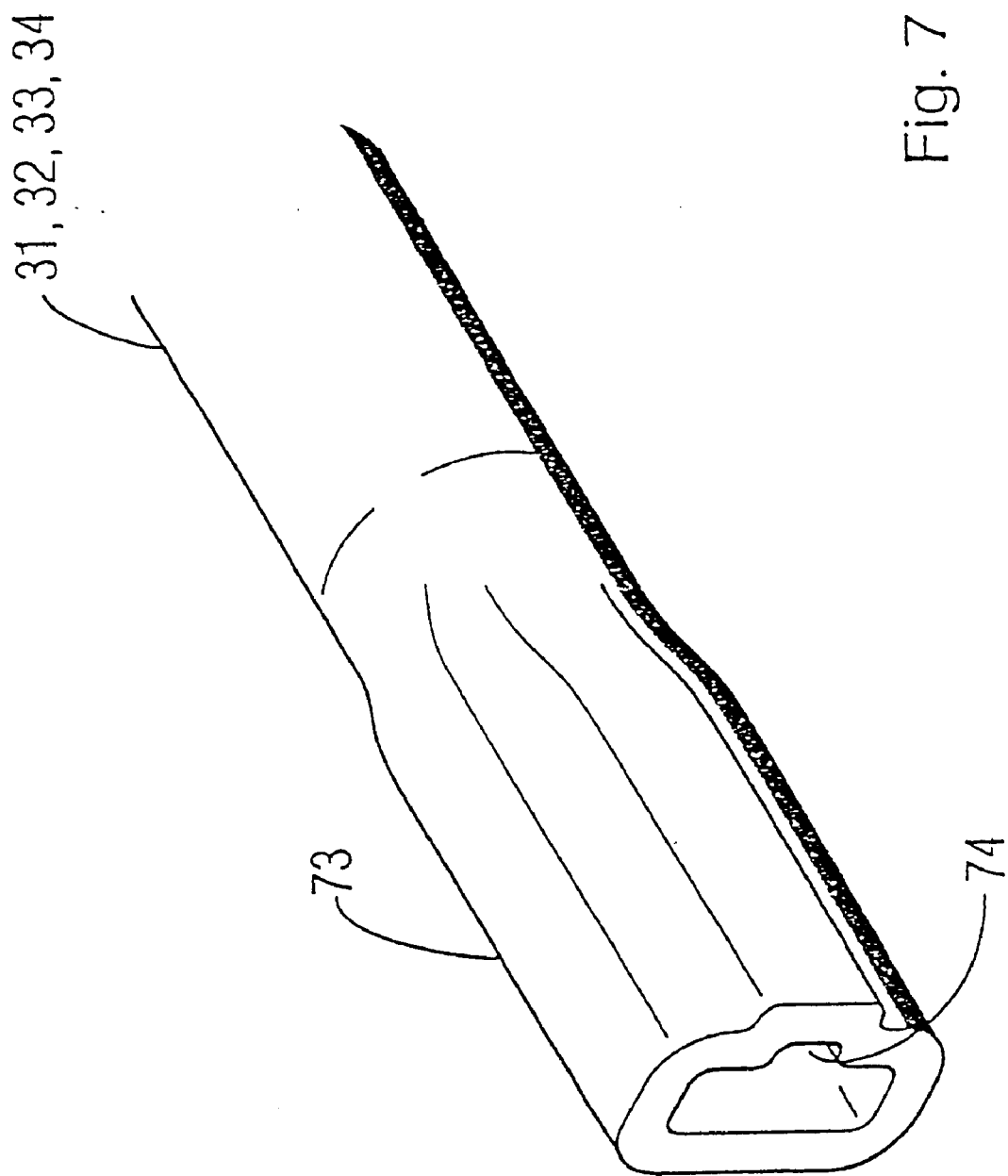
FIG. 7 is a broken-away perspective of the hinge-side end of a strut section of the separating device shown in FIG. 1.

In the mounted state according to FIG. 2, the two hinge lash plates 35*a*, 35*b* lie with their flat sides 38 on one another and are bound with one another in the zone of the hinge bore 47 of the hinge bolt 51, turnably but otherwise rigidly. By reason of the hinge bolt 51 the two lash plates 35*a*, 35*b* can execute only a rotary movement in a plane that is defined by the flat side 38.

The other two flat sides 39, with riveted hinge 30, face outward.

The hinge covers 36*a* and 36*b* are shell shaped and they consist of an essentially level base 52, on which an endlessly circulating side wall 53 is molded. The contour of the side wall 53 largely follows the outer contour of the lash plate section 37, while the side wall 53 forms a straight wall 54 in the region of the crimp 44.

The side wall 53 is provided on its free edge lying away from the base 52, with an offset 55 with which, as FIG. 2 shows, it embraces the outside of the lash plate section 37. The straight side wall 54 follows, with its free edge lying away from the base 52, the contour of the flat side 43, or 39 in the region of the crimp 44. In the mounted state therewith the lash plate section 37 is closed by the cover 46, while the continuation 41 projects under the wall 54.

A cylindrical continuation 56 is molded on the base, the axial length of which is such that it rests on the flat side 39 when the offset 55 likewise impinges on the flat side 39. The continuation 56 includes a passage bore 57 which goes over on the outside of the cover 36 into the conical depression 58. A countersunk screw 59 leads through the conical bore thus obtained which is screwed into the threaded bore 49. In this manner the cover 36 is fixed on the lash plate 35*a*, 35*b*.

The cover 36*b* contains in addition to the bore 57, a further cylindrical bore 61 which is surrounded on the inside of the cover 52 by a short cylindrical collar 62. The bore 61, with cover 36*b* mounted, is flush with the cylindrical bore 48. The latter in turn, as FIG. 3 makes evident, are located above the hinge bore 47 and, namely, in such a plane that the two continuations 41 are extend relative to one another when the bores 48, as FIG. 2 makes evident, are brought into coverage with one another.

The bores 48 in the two hinge lash plates 35*a* and 35*b* serve for receiving of a cylindrical locking bolt 63, which is freely shiftable in the bores 48. With the aid of a leaf spring 64, which is shown in detail in FIG. 6, the locking bolt 63 is pre-stressed in the direction of the bore 61. The length of the locking bolt 63 is equal to about twice the thickness of the lash plate section 37.

In order to bring the hinge bolt 51 into the unlocked position, an unlocking button 65 is present, which is composed of a cylindrical shaft 66 and of an actuating head 67. With the cylindrical shaft 66, the unlocking button is longitudinally movably guided in the cylindrical bore 61 and is secured against dropping out by a claw spring disk 68, which is seated on the shaft 66.

The leaf spring 64 lies on the outward-facing side 39. It is shown in plan view in FIG. 6, and it ha a curved course with a spring arm 69 which presses against the locking bolt 63. On its opposite end the leaf spring 64 goes over into a fastening eye 71 which during assembly goes to lie on the threaded bore 49 and is clamped between the lash plate section 37 and the continuation 56 of the respective cover 36.

The outer contour of the leaf spring 64 follows essentially the inner contour of the cover 36, so that the leaf spring 64 cannot be twisted on the flat side 39. To this end, its strongly notched zone 72 impinges on the inside of the straight side wall 54. In this manner it is ensured that a free end of the spring arm 69 can always act on the locking bolt 63.

The assembly and structure of the hinge 30 is as follows:

Two identical hinge lash plates 35 are placed on one another in such manner that their flat sides 38 are touching. The flat sides 38 are the sides that are depressed with respect to the crimp 44. Through the aligned hinge bores 47, the hinge bolt 51 is plugged through and riveted on both sides, as shown. Subsequently, the two hinge lash plates 35*a* and 35*b* are joined with one another without play and can be swung against one another with respect to an axis of rotation which coincides with the axis of the hinge bore 47.

Thereupon the leaf spring 64 is laid on the hinge lash plate 35 which is represented on the left side in FIG. 2 and, namely, in a position in which the eye 71 is congruent with the threaded bore 49, while the free arm 69 of the spring arm covers the bore 48. Thereupon the cover 36 is screwed on with the aid of a corresponding screw 59, in which process the leaf spring 64 is simultaneously fixed in the correct position on the respective hinge lash plate 35. Thereupon the two hinge lash plates 35a and 35b are brought into a position in which the bores 48 are in alignment with one another, sot hat the locking bolt 63 can be plugged into the bores. In conclusion, the other cover 36 is fastened in a similar manner on the still free-laying hinge lash plate 35b. Previously the unlocking button 65 had also been plugged in and secured with the claw spring disk 68.

By depressing the unlocking button 65, the locking bolt 63 is pushed out of the bore 48 of the hinge lash plate 35b, while simultaneously the shaft 66 advances into the bore 48. As soon as the unlocking button 65 is completely depressed to the extent that its actuating button 67 lies on the stop on the cover 36, the locking bolt 63 is pressed back far enough against the action of the leaf spring 64, so that it no longer extends into the bore 48 of the hinge lash plate 35b. The two hinge lash plates 35a and 35b can now be turned against one another whereby, after a short swinging motion, the unlocking button 65 can be released without any renewed locking occurring. After a short swinging path, the locking bolt 63—which now is still present only in the bore 48 of the hinge lash plate 35—stands opposite the flat side 38 of the other hinge lash plate 35. Therewith there is possible at any time a swinging of the two hinge lash plates 35a and 35b against each other.

As soon as the hinge lash plates are again swung back into a position in which the two continuations 41 run stretched to one another, the two locking bores 48 again come into coverage to one another, and the leaf spring 64 can press the locking bolt 63 back into the position according to FIG. 2, in order to block the hinge 30 in the stretched position.

The locking bolt 63 is prevented from dropping out in the opposite direction by the unlocking button 65, as its claw spring disk 68 comes to lie on the free face side of the collar 62.

Each of the strut sections 31–34 consists of a correspondingly long steel tube section with round cross section. At the end at which the connection between the hinge 30 and the strut section 31–34 is later established, the tube that is at first cylindrical is reshaped over the length of a zone 73, as is evident from FIG. 7, so that an elongated oval cross section results with a bulge 74 for the reception of the bead 45. Accordingly, the cross section of the strut section 31–34 essentially corresponds to the cross section of the respective continuation 41 in a section plane, at a right angle to its extent in length direction and, namely, over a length which is somewhat greater than the length of the continuation 41.

Figure 8:
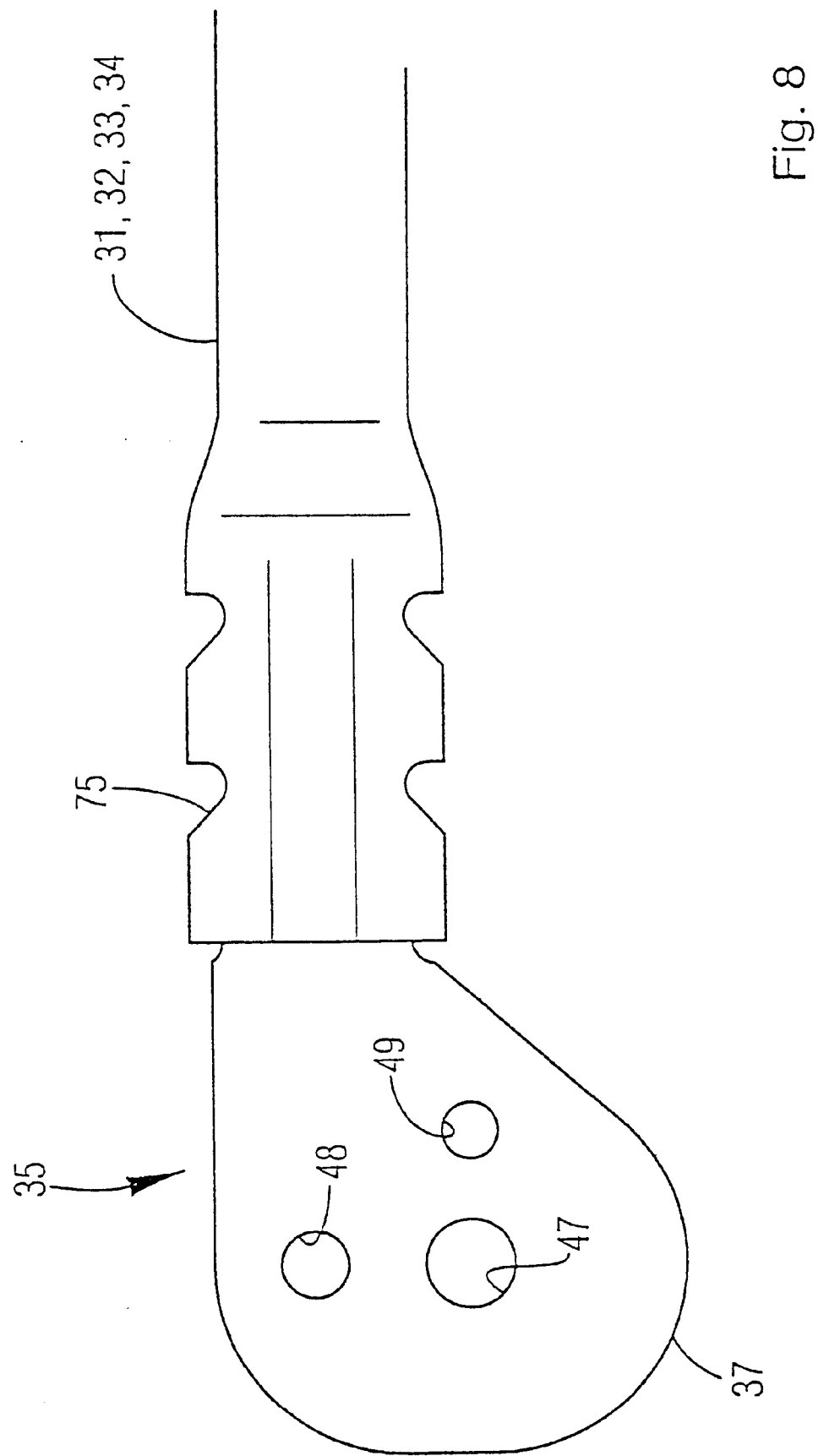
FIG. 8 is a plan view of assembled strut and hinge lash plate.

The connection with the hinge 30 occurs, as FIG. 8 makes evident, as the respective strut 31–34 is plugged with its end 73 forward onto the corresponding continuation 41 of the hinge lash plate 35. Thereupon notches 75 are pressed into the strut 31–34, whereby the sawtooth notches 46 are impressed in the wall material of the strut. Hereby there results a play-free and pull-fast connection between the hinge strip 35 and the respective strut 31–34. The connecting with the strut sections 31–34 can take place before or after the assembling of the hinge 30.

In the interest of completeness, the following is a quick explanation of the energy-consuming elements 22, the functioning of which is described in detail in DE-A4336380.

The energy-consuming element 22 includes a tubular plastic sleeve 81, in which there is plugged, longitudinally slidably, a cylindrical shaft 82 of the anchoring element 23. Onto the shaft 82, several outwardly projecting lash plates 83, 84, 85, are squeezed which run in corresponding elongated grooves 86, 87 that are formed in the side wall of a cylindrical bore 88 of the sleeve 81. In this manner the shaft 82 is untwistable in the sleeve 81. The screw pressure spring 89, which is present in the bore 88, is supported on the one hand on the two lash plates 83 and 84, flush with one another and, on the other hand, on a ring 91 which consists of a solid material and is fixed with the aid of beads in the two struts sections 31, 32.

The anchoring element 23 is pushed outward by the pressure spring 89 into the advanced position in which the lash plate 85 bears on the rear side of the ring 91.

In the region of the lower loop 17, two foil pocket sections 95 and 96 are additionally sewn on the separating net 14, the free edges 97, 98 of which are provided in each case with a part of a respective zipper fastener 97a, 98a.

The two pocket sections 95, 96 are side walls of a pocket which serves for packing of the separating device when not in use.

For the explanation of the handling of the separating device 13 of the invention, let it be assumed that it is installed in the vehicle, as FIG. 1 shows. The two hinges are standing in the position in which the continuations 41 and therewith the strut sections 31–34 are located in each case in the extension of the respective other strut section 31–34, as can be seen in the figure. As is yielded from the above description of the hinge 30, in this swinging position of the locking bolt 63, the locking bolt 63 is snapped into place and it blocks the hinge 30 against buckling.

In the position of use, the axis of the hinge bolt 51 both of the upper hinge 30 and also of the lower hinge 30, is aligned parallel to the longitudinal axis of the vehicle.

If in the position of use, because of a crash, an object is thrown out of the load space against the separating net 14, it is retained by this separating net 14. There, the upper and the lower struts 19, 21 are each strained by buckling, in which case the maximum buckling force arises in the region of the joint 30. Since the two hinge lash plates, lie flat on one another over the lash plate section 37, the hinge 30 is capable of withstanding relatively great buckling forces. Moreover, the transition point between the lash plate section 37 and the continuation 41 is reinforced by a bead 45, whereby altogether a stability is also yielded in this region, which corresponds to the stability of a continuous steel tube which has the dimensions of the strut sections 31–34.

When the separating device 13 is not needed, for its removal first the lower tension bands 26 with their hooks are disengaged from the eyes 27. Thereupon the upper strut with its anchoring member 23 is removed from the T-groove 25. The separating device 13 can now be completely removed from the vehicle.

Figure 11:
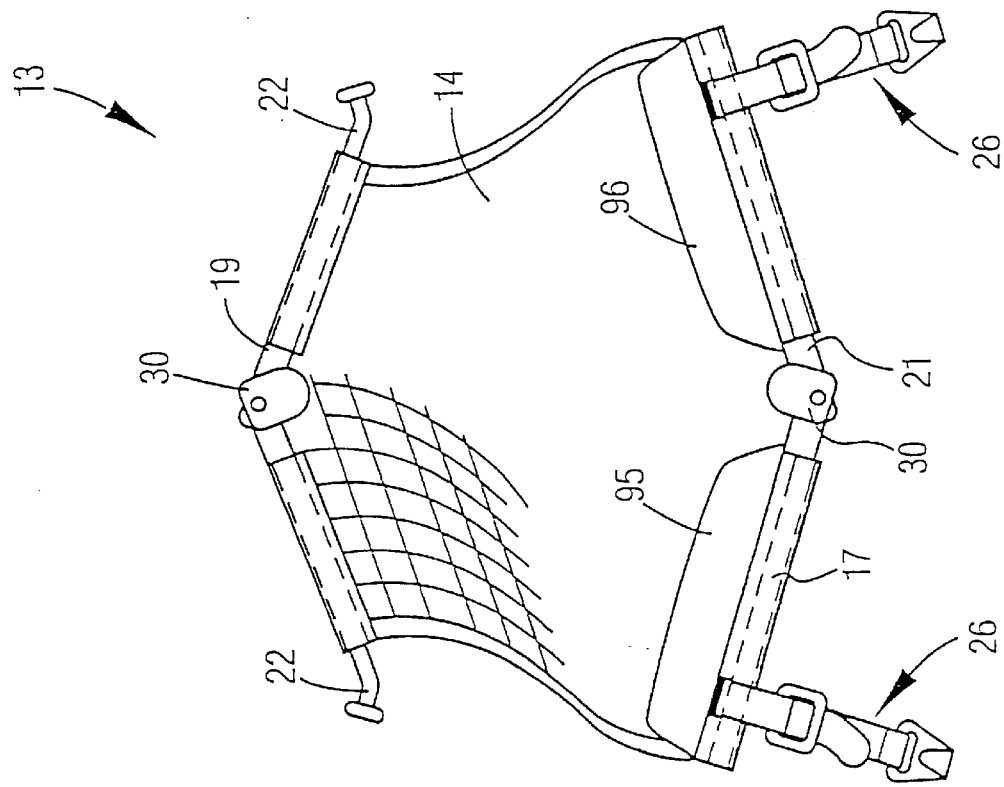
Figure 10:
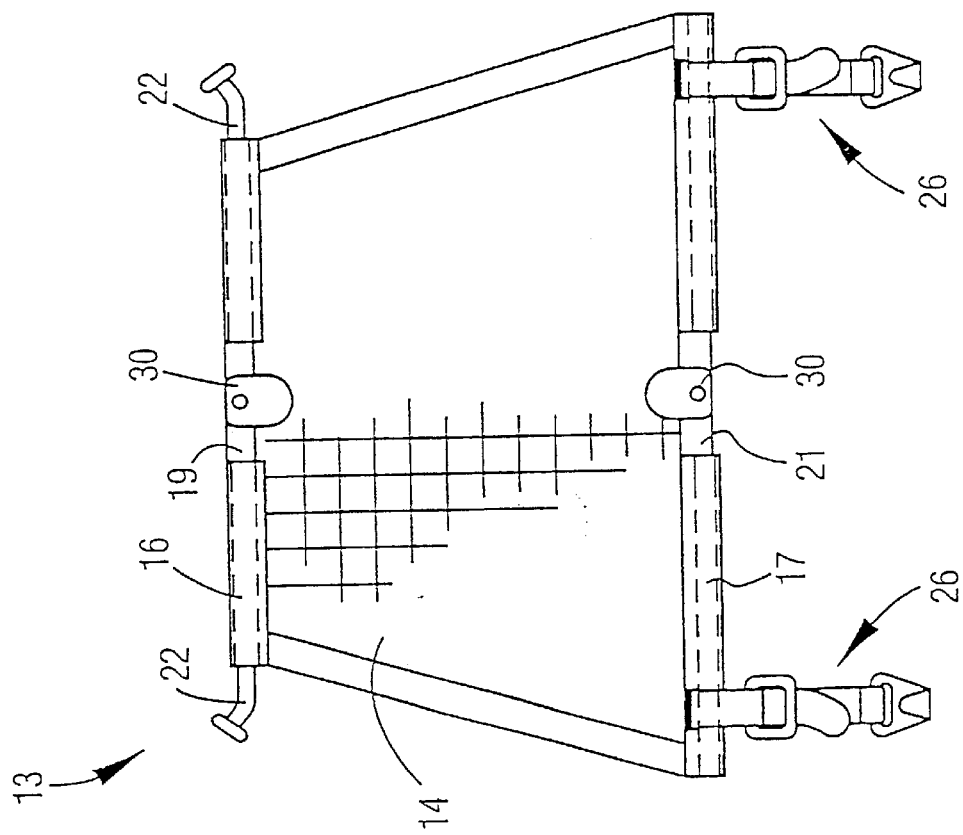

After the removal from the vehicle, a picture according to FIG. 10 is produced. The user now can, for example, first unlock the hinge 30 of the lower strut 21, by depressing the unlocking button 65. Thereby, the hinge 30 is freed and can be folded in as is thoroughly described above. FIG. 11 shows the beginning of the folding-in.

This process is then repeated with the unlocking button 65 of the hinge 30 on the upper strut 19. To be sure, the upper strut 19 is completely folded together as far as the point at which its two strut sections 31 and 32 collide with the mushroom-shaped heads 24, for example, in the region of their ends away from the hinge 30. According to the dimensions of the separating net 14, the two lower strut sections 33 and 34 follow this folding movement.

Since the axis of the hinge 30 stands vertically on the spanned-open surface of the separating net 14, and the strut 19 is otherwise untwistably joined with the net 14, to complete the folding process the strut is rotated over 90°, until the axis of the hinge 30, by this handling, comes to lie parallel to the loosely hanging separating net 14. In this position, the folding together of the strut 19 is not hampered by the separating net 14.

In the folded-up state, the two strut sections 31, 32 have in the immediate vicinity of the hinge 30 a spacing that is greater than what corresponds to the diameter of even a strong finger, so that the danger of a crushing does not arise. This spacing is achieved because the hinge bore 47 is laterally offset with respect to the continuation 41.

If this has not yet happened, then also the lower strut 21 is completely folded together in a similar manner. Thereupon, from the upper folded-up strut 19 the separating net 14 is wound onto the folded-up strut 19 until the resulting winding arrives on the folded-up strut 21.

By reason of the folding-in of the lower strut 21, the two cut-outs 95, 96 come into a position in which they run essentially parallel to one another, and, namely, on the outside of the winding obtained from the separating net 14, and on both sides of that obtained winding. Now, the zipper fasteners 97a, 98a that is fastened to the free edges 96 and 97, respectively, can be closed, wherewith the winding is securely enclosed in the thus-formed pocket. Any unfolding is prevented by the pocket sections 95 and 96 connected with the zipper fastener, which form the side walls of the pocket. The pocket obtained is not a complete pocket, for it lacks a bottom. Nevertheless, it is capable of largely securing the winding against unfolding.

The effective length of the struts 19, 21 is reduced by half through the folding, wherewith the resulting winding has a length that is clearly shorter than that corresponding to the spanned-open safety net 14. The folded-together, and wound-up, separating net 14 can now be directly accommodated inside the motor vehicle.

In order to prevent any damage to the separating net 14 in the region of the hinges 30, the separating net 14 as shown in FIG. 1 can be provided with a recess 98 in the neighborhood of the hinges 30.

In a deviation from the embodiment represented, three is also the possibility of using, in addition to the struts 19 and 21 provided on the end loops 16 and 17, a third strut which runs about in the middle and is otherwise formed exactly like the struts 19 and 21. This additional strut can cooperate with stops in the motor vehicle in order additionally to contribute to the stability of the separating device 13.

A separating device includes a separating net or a separating grid made of a flexible material. On two edges of the separating net running parallel to one another, in each case a reinforcing strut is provided. One of the two reinforcing struts serves to anchor the separating net underneath the vehicle roof, while the other reinforcing strut is anchored at a distance from thereof lining, for example on the rear-seat back or on the bottom of the load space. The two reinforcing struts contain in each case a hinge. In this manner the separating device can be folded in its width and thereupon rolled up. A packing arrangement in the form of a pocket provided on the separating device serves for securing of the folded separating net in the packed position.

What is claimed is:

1. A removable separating device for separating a load compartment from a passenger space in a motor vehicle, the device comprising:

an upper strut removably mountable in the motor vehicle, a lower strut removably mountable in the motor vehicle, a flexible separating medium fastened between said upper and lowered struts for preventing items from the storage compartment from entering the passenger compartment in the event of sudden stoppage of the motor vehicle, said upper and lower struts each having a respective hinge which defines a hinge axis that subdivides the strut into strut sections, said hinges each having two hinged lash plates that are joined with one another by a hinge bolt, and said strut sections of the upper and lower struts each being pivotal relative to its respective hinge for shortening the effective length of the strut by at least 30 percent of its maximum length for more compact storage.

2. An easy to store removable separating device for separating a load compartment from a passenger space in a motor vehicle, the device comprising:

an upper strut removably mountable in the motor vehicle, a lower strut removably mountable in the motor vehicle, a flexible separating medium fastened between said upper and lower struts for preventing items from the storage compartment from entering the passenger compartment in the event of sudden stoppage of the motor vehicle, said struts each comprising a pair of strut sections, said sections of each strut being movable relative to each other into an operative mounting position that defines an effective length of the storage device, said sections of each strut being connected with a connector which secures the sections of the strut in the operative mounting position, and said connectors each being manually releasable without the necessity for a tool for enabling movement of the sections of the strut to an inoperative dismounted storable condition that shortens the effective lengths of the struts by at least 30 percent of its maximum length for compact storage of the separating device.

3. The separating device according to claim 2 including a pair of pocket sections which are releasably connectable together to define a pocket within which the storage device is at least partially contained when in an inoperative condition.

4. The separating device according to claim 3 in which said pocket sections are secured to said separating medium.

5. The separating device according to claim 4 in which said pocket sections each include a zipper portion, said zipper portions of the pocket sections being releasably engageable to fasten the pocket sections together.

6. The separating device according to claim 2, in which upon release of each strut the sections of the strut are foldable for shortening the effective length of the strut.

7. The separating device according to claim 2, wherein the connector of each strut is a hinge which defines a hinge axis that subdivides the strut into said strut sections and which permits shortening the effective length of the strut by folding of the strut sections.

8. The separating device according to claim 7, wherein the hinges for the respective struts are arranged such that said strut sections of each strut are of equal length.

9. The separating device according to claim 7, wherein the hinges of the upper and lower struts are aligned with each another such that when the struts and separating medium are mounted in a motor vehicle the struts are parallel to each other and the hinges of the struts lie on a straight line which extends perpendicular to the upper and lower struts.

10. The separating device according to claim 7, wherein the axes of the hinges for the upper and lower struts are aligned in a horizontal direction when the separating medium is mounted in the motor vehicle and in an operative position.

11. The separating device according to claim 9, wherein the strut sections of the upper strut and the strut sections of the lower strut are each radially offset with respect to the respective hinge axis in such manner that when the upper and lower struts are folded, the strut sections of each strut extend parallel to one another.

12. The separating device according to claim 7, wherein the strut sections of the upper strut and the strut sections of the lower strut are each radially offset with respect to the axis of the respective hinge such that when the upper and lower struts are folded ends of the strut sections lying away from the respective hinge of both the upper and lower struts impinge on one another and the ends of the strut sections closest the hinge are spaced from one another.

13. The separating device according to claim 12, wherein ends of the strut sections closest to the hinge are spaced apart at least approximately 1.5 cm when the strut sections are folded.

14. The separating device according to claim 7 in which the hinges of the upper and lower struts are simple hinges having only one hinge axis.

15. The separating device according to claim 1, characterized in that each hinge lash plate carries a continuation plate to which the respective strut section is fastened.

16. The separation device according to claim 1, wherein, when the hinges for the upper and lower struts are in a position in which their respective continuation plates lie on a straight line, their respective hinge lash plates laterally offset with respect to the continuation plates.

17. The separating device according to claim 7, wherein the hinges for the upper and lower struts each are lockable in at least one position.

18. The separating device according to claim 7, wherein the hinges for the upper and lower struts are releasably lockable in a closed form.

19. The separating device according to claim 15, wherein said one position corresponds to an open position of the respective strut.

20. A separating device according to claim 1, wherein the hinges for the upper and lower struts are releasably lockable in a closed form and the hinge lash plates of each hinge contain openings which are flush with one another in a locking position and further including a bolt insertable into the openings for locking the respective hinge.

21. The separating device according to claim 20, wherein the bolt for each hinge is pre-tensioned into an inserted position by a spring.

22. The separating device according to claim 20, wherein the bolt for each hinge includes an actuating member which is supported in the region of one of the hinge lash plates.

23. The separating device according to claim 15, wherein each hinge lash plate includes a bead that extends into its respective continuation plate for stiffening.

24. The separating device according to claim 15, wherein the continuation plate of each hinge lash plate is crimped off in such manner that the continuation plates associated with each hinge extend in a common plane.

25. The separating arrangement according to claim 15, wherein each hinge lash plate contains recesses in an edge thereof.

26. The separating device according to claim 1, wherein each hinge lash plate has an associated shell-shaped covering.

27. The separating device according to claim 6, wherein the strut sections are tubular.

28. The separating device according to claim 15, wherein each strut section is formed by a cylindrical tube and the tube is flattened in cross section for receiving the continuation plate of the respective hinge lash plate.

29. The separating device according to claim 25, wherein the strut sections each have one end plugged onto the continuation plate of the respective hinge lash plate and crimped thereon with the respective strut section being displaced into the edge recesses of the hinge lash plate.

30. The separating device according to claim 7, wherein the strut sections each comprise an energy-absorbing deformable material.

31. The separating device according to claim 1, wherein the separating member comprises a net.

32. The separating device according to claim 1, the upper and lower struts are untwistably fastened to the separating medium.

33. The separating device according to claim 1, wherein the upper and lower struts are unshiftably fastened to the separating medium.

34. The separating device according to claim 7, wherein the separating medium contains a recess in the area of each hinge.

35. The separating device according to claim 1, wherein one of the upper or lower strut has anchoring members on an end side.

36. The separating device according to claim 35, wherein at least one of the anchoring members is guided longitudinally slidably with respect to the strut.

37. The separating device according to claim 1, wherein the lower strut includes anchoring members spaced a distance from ends of the lower strut.

38. The separating device according to claim 37, the anchoring members have a band-like construction.

* * * * *